US005347269A

United States Patent [19]

Vanden Heuvel et al.

[11] Patent Number: 5,347,269

[45] Date of Patent: Sep. 13, 1994

[54] ICONIC DUPLICATE MESSAGE INDICATOR

[75] Inventors: Dean P. Vanden Heuvel, Chandler; Danny Walker, Gilbert, both of Ariz.

[73] Assignee: Motorola, Inc., Schaumburg, Ill.

[21] Appl. No.: 880,384

[22] Filed: May 8, 1992

[51] Int. Cl.$^5$ .............................................. H04Q 7/00

[52] U.S. Cl. ............................... 340/825.44; 370/94.1

[58] Field of Search .................................... 340/825.44

[56] References Cited

U.S. PATENT DOCUMENTS

| | | | |
|---|---|---|---|
| 4,682,148 | 7/1987 | Ichikawa et al. ................ | 340/311.1 |
| 4,713,808 | 12/1987 | Gaskill et al. ...................... | 370/94.1 |
| 4,812,813 | 3/1989 | Ide et al. .......................... | 340/311.1 |
| 5,157,391 | 10/1992 | Weitzen .......................... | 340/825.44 |
| 5,185,604 | 2/1993 | Nepple et al. .................. | 340/825.44 |

OTHER PUBLICATIONS

Motorola Inc., *Motorola Advisor Message Receiver,* 1990, pp. 38–39.

*Primary Examiner*—Donald J. Yusko
*Assistant Examiner*—Edward Merz
*Attorney, Agent, or Firm*—Kelly A. Gardner

[57] ABSTRACT

In a selective call receiver for presenting a plurality of messages to a user, a method comprises the steps of receiving (205) a message, storing (208) the received message in a memory, and determining (210) whether the received message is substantially equivalent to previously stored messages. A further step includes displaying (225) a duplicate message icon if the received message is a duplicate message that is substantially equivalent to one of the previously stored messages.

14 Claims, 3 Drawing Sheets

ICONIC DUPLICATE MESSAGE INDICATOR

FIELD OF THE INVENTION

This invention relates in general to selective call receivers, and more specifically to a method and apparatus for indicating to a selective call receiver user that a received message is a duplicate of a previously received message.

BACKGROUND OF THE INVENTION

Selective call receivers, such as pagers, receive radio frequency (RF) signals. In conventional pagers, the pager decodes optional message data contained in a received RF signal and alerts the user that a message has been received, subsequent to which the message may be stored in a memory. The pager may present the message to the user either automatically or, upon selection by the user, manually. In conventional alphanumeric pagers, icons may be visually presented on a liquid crystal display (LCD) to alert the user of specific conditions. For example, if the voltage of a battery supplying primary power to the pager drops below a predetermined threshold, an icon resembling a battery may be displayed on the LCD. Additionally, a standby information display located in a specific area of the LCD may be used to display message indicator icons to indicate the presence of messages stored in the memory. This feature allows the user to detect the number of messages stored in the memory without reading each message. At any time, the user may choose to read any of the messages stored in the memory by selecting a corresponding message indicator displayed on the standby information display. The message is subsequently displayed on the LCD. Although the user may be aware, by glancing at the message indicators, of the number of messages stored in the memory, he cannot determine whether any of the messages are duplicates without reading each message. Under certain circumstances, this could inconvenience the user. For example, the user may begin to read a lengthy message before realizing that the message is a duplicate of a message that he has previously read, thereby wasting time.

Also, many conventional pagers can store only a limited number of messages in the memory. Once the limited number of messages has been stored, older messages are deleted to provide space in the memory as each new message is received. If a new message is a duplicate of a stored message, the new message may be stored, possibly causing an older message, perhaps of importance to the user, to be deleted from the memory.

Thus, what is needed is a method and apparatus for indicating to the user that a duplicate message has been received, without the disadvantages of treating the duplicate message as a normally received message.

SUMMARY OF THE INVENTION

A selective call receiver for presenting a plurality of messages to a user comprises a receiver for receiving messages, a memory coupled to the receiver for storing the received messages, and determination circuitry coupled to the receiver and the memory for determining whether a received message is substantially equivalent to any of previously stored messages. Presentation circuitry coupled to the memory visually displays message icons to the user indicative of the previously stored messages. The presentation circuitry is further coupled to the determination circuitry for displaying a duplicate message icon to the user in response to the determination circuitry determining that the received message is a duplicate message that is substantially equivalent to one of the previously stored messages. The duplicate message icon indicates which of the previously stored messages is the one of the previously stored messages.

In a selective call receiver for presenting a plurality of messages to a user, a method for indicating to a user that a duplicate message has been received comprises the steps of receiving a message and storing the received message in a memory. The method further comprises the steps of determining whether the received message is substantially equivalent to any of previously stored messages and displaying a duplicate message icon if the received message is a duplicate message that is substantially equivalent to one of the previously stored messages, wherein the duplicate message icon indicates which of the previously stored messages is the one of the previously stored messages.

DESCRIPTION OF A PREFERRED EMBODIMENT

Figure 1:
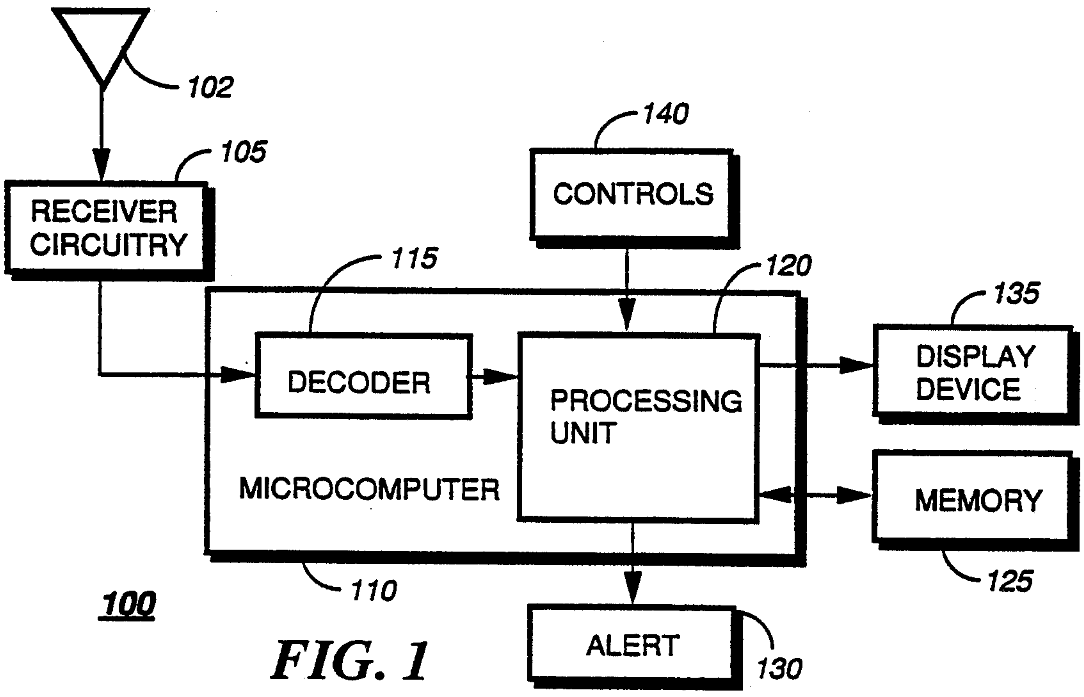
FIG. 1 is a block diagram of a selective call receiver in accordance with a preferred embodiment of the present invention.

Referring to FIG. 1, a block diagram of a selective call receiver 100 in accordance with a preferred embodiment of the present invention is depicted. The selective call receiver 100, e.g., a pager, comprises an antenna 102 for receiving a radio frequency (RF) signal, and receiver circuitry 105 coupled to the antenna 102 for demodulating the RF signal. A microcomputer 110 coupled to the receiver circuitry 105 comprises a decoder 115 for decoding the signal to recover an address and a message contained therein, subsequent to which a processing unit 120 stores the message in a memory 125. The processing unit 120 internal to the microcomputer 110 for processing the message and sending a signal to an alert mechanism 130, which alerts the user that a message has been received.

In accordance with the present invention, the processing unit 120 further processes the message to determine whether the message is a duplicate of at least one previously received message stored in the memory 125. Thereafter, the processing unit 120 sends a signal directing a display device 135, e.g., a liquid crystal display (LCD) to display an icon representing the message. The icon may be a message indicator or, if the processing unit 120 determines that the message is a duplicate of a previously received message, a duplicate message indicator that is distinguishable from the message indicator. In the latter case, the processing unit 120 does not store the duplicate message in the memory 125.

If the user wishes to read the message, he may select the message indicator corresponding to the message by manipulating user actuated controls 140 located on the exterior of the pager. Thereafter, the processing unit 120 sends the message to the display device 135 for presentation.

Figure 2:
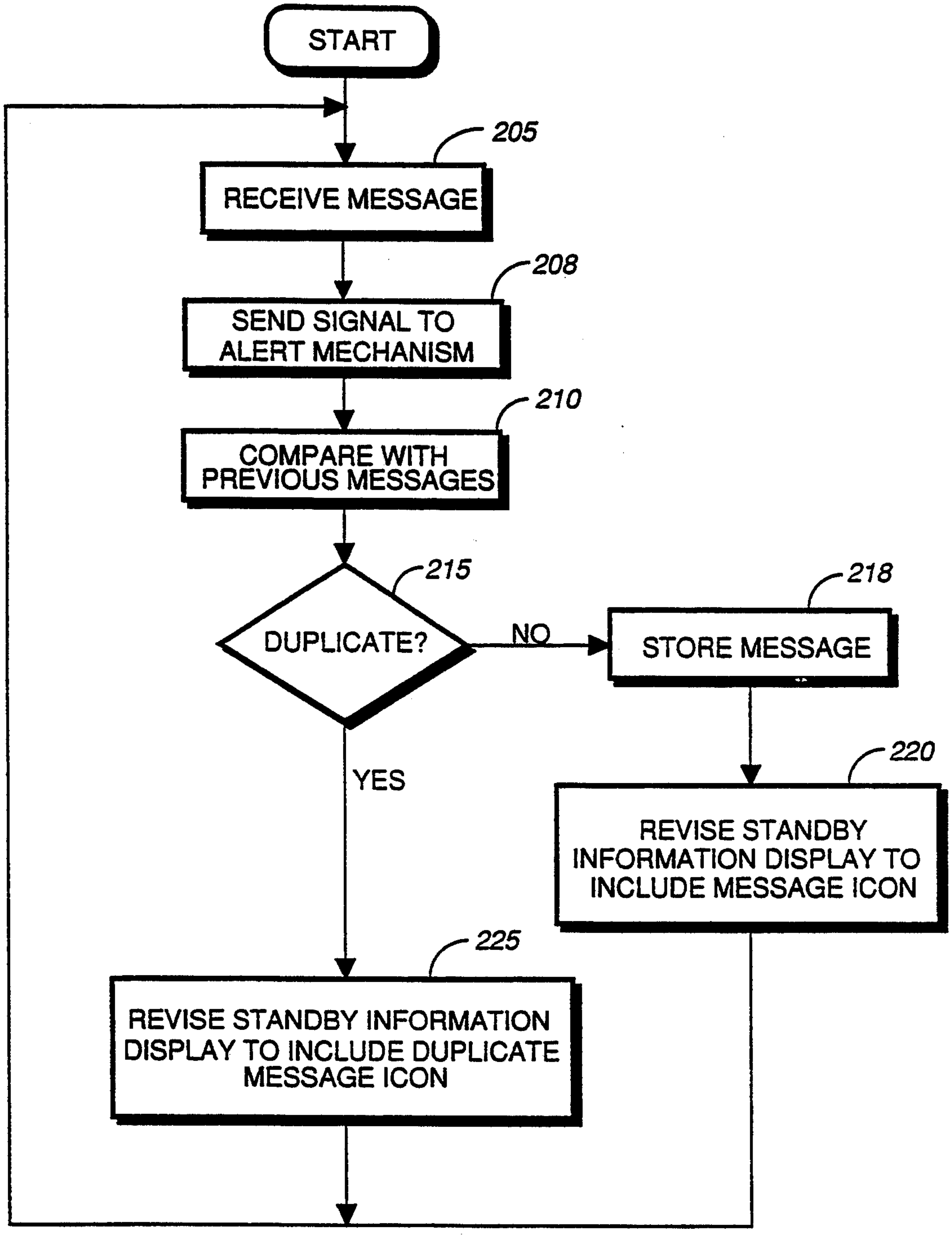
FIG. 2 is a flowchart depicting the operation of the microcomputer processing unit of FIG. 1 in accordance with the preferred embodiment of the present invention.

Referring next to FIG. 2, a flowchart depicts the operation of the microcomputer processing unit 120 (FIG. 1) in accordance with the preferred embodiment of the present invention. When a message is received 205 by the pager, the processing unit 120 sends 208 a signal to the alert mechanism 130, in response to which the user is alerted that a message has been received. The processing unit 120 compares 210 the received message with previously received messages stored in the memory 125. If the received message is not a duplicate 215 of at least one of the previously received messages, the received message is stored 218 in the memory and a standby information display is revised 220 to include a message indicator representing the received message. In this manner, the number of message indicators displayed on the standby information display indicates the number of messages stored in the memory 125. If the received message is a duplicate 215 of at least one previously received message, the standby information display is revised 225 to include a duplicate message indicator, while the received message is not stored in the memory 125 (FIG. 1). The duplicate message indicator preferably indicates which of the previously received messages is a duplicate of the received message.

In accordance with the present invention, reception of the duplicate message is communicated to the user, while the duplicate message itself is not stored. The user is informed of the reception of the duplicate message by the display of the duplicate message indicator. The user may read the previously stored message which is the same as the duplicate message received, or, if he has previously read the message, may advantageously save time by choosing not to read the previously stored message.

Figure 3:
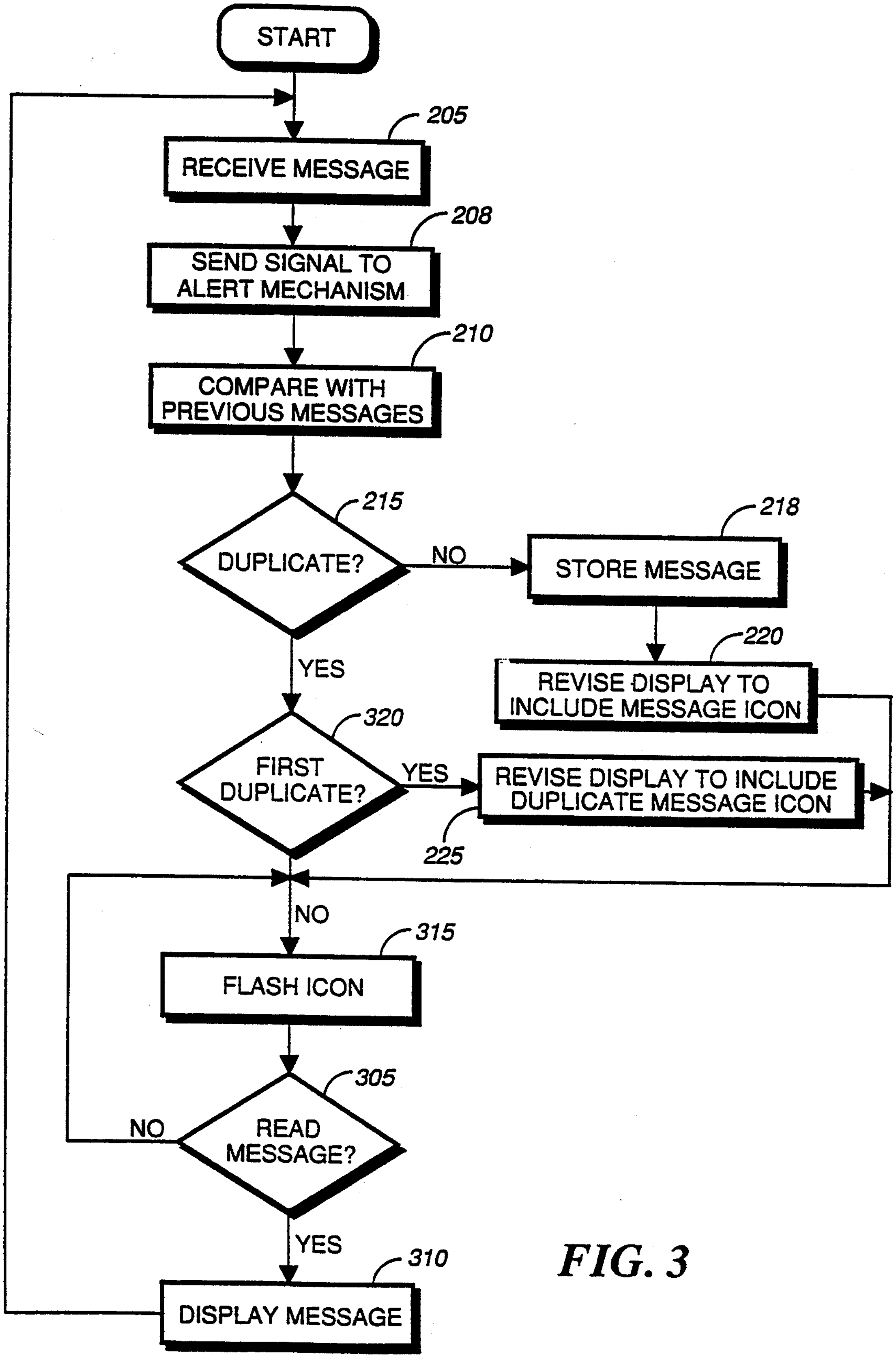
FIG. 3 is a flowchart depicting the further operation of the microcomputer processing unit of FIG. 1, wherein unread messages are indicated to the user, in accordance with the preferred embodiment of the present invention.

Referring next to FIG. 3, further features are incorporated into the method depicted in FIG. 2. One such feature is the use of a flashing icon to indicate an unread message. After a message indicator or a duplicate message indicator has been displayed on the standby information display, indicating that a message has been received, the user may choose to read 305 the message. If the user chooses to read 305 the message, the message will be displayed 310 on the display device, e.g., LCD. If the user postpones reading 305 the message until a later time, the icon corresponding to the message will flash 315, indicating an unread message, until the user reads the message.

Subsequent to sending 208 a signal to the alert mechanism 130 (FIG. 1), the processing unit 120, in accordance with the present invention, determines the quantity of previously received messages that are equivalent to the received message. If the processing unit 120 determines 215 that the received message is a duplicate message equivalent to one of the previously received messages, the processing unit 120 further determines 320 other duplicates of the previously received message have been received. If the duplicate message is the first received duplicate of a previously received message 320, the standby information display is revised 225 to include duplicate message indicator. In the preferred embodiment of this invention, the duplicate message indicator is displayed beneath a message indicator corresponding to the previously received message that is equivalent to the duplicate message. Until the user has read 305 the duplicate message, the message indicator and the duplicate message indicator will flash 315 to indicate that a duplicate message received by the pager is unread. The presentation of the duplicate message icon in this manner conveniently informs the user not only that a duplicate message has been received, but also which previously received message is equivalent to the duplicate message. Therefore, the user may quickly select the message to be read or choose not to read a duplicate message, if it is equivalent to a previously received message that the user has already read.

If the duplicate message is not the first received duplicate of the previously received message 320 (e.g., a prior duplicate message, equivalent to the duplicate message, has been previously received). In this case, a duplicate message indicator corresponding to the prior duplicate message is already displayed on the standby information display. The duplicate message indicator is displayed beneath the message indicator corresponding to the previously received message that is equivalent to the duplicate message and to the prior received duplicate message. Rather than wasting space by displaying a second duplicate message indicator beneath the message indicator, the message indicator and the duplicate message indicator simply begin to flash 315 to indicate that, once again, a duplicate message has been received. When the user reads 305 the message, the message indicator and the duplicate message indicator will cease flashing. Further duplicate messages equivalent to the previously received message will cause the message indicator and the duplicate message indicator to again flash 315 until the user reads 305 each duplicate message. Because the user can easily determine which of the stored messages are unread, he may advantageously read the messages at a later, more convenient time.

Figure 4:
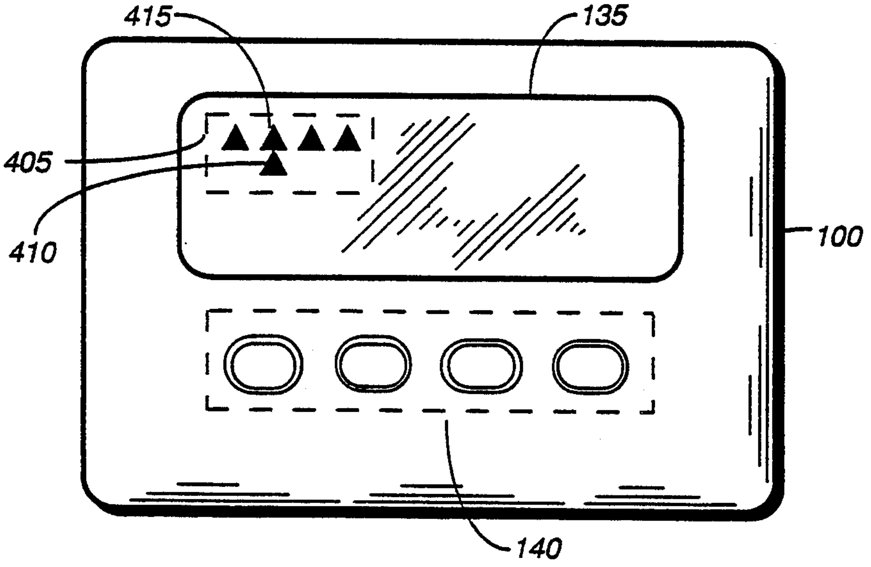
FIG. 4 is an illustration of the presentation of duplicate message indicators in accordance with the preferred embodiment of the present invention.

FIG. 4 illustrates the use of duplicate message indicators to indicate that a duplicate message has been received and, preferably, which of the previously received messages is a duplicate of the received message. A standby information display 405 located on the display device 135 is used to display icons corresponding to received messages. For example, five message indicators, shown as triangular icons, are displayed on the standby information display 405 to indicate that five messages have been received by the pager. One of the five message indicators is a duplicate message indicator 410 displayed beneath a second message indicator 415 corresponding to a second received message. The duplicate message indicator 410 indicates that a duplicate message received by the pager is equivalent to the second received message corresponding to the second message indicator 415. When the user looks at the LCD, he immediately knows that the duplicate message contains the same information as that contained in the second message.

In accordance with the preferred embodiment of the present invention, the reception of more than one duplicate message does not cause more than one duplicate message indicator to be displayed. If a second duplicate message is received by the pager, the previously displayed duplicate message indicator and the message indicator corresponding to the stored message simply begin to flash. The flashing of the icons alerts the user that another duplicate message has been received by the pager. The use of duplicate message indicators in this manner allows the user to discern, by merely glancing at the display device 135, which of the received messages, if any, are duplicates of each other. This feature prevents the user from wasting time by reading messages with which he is already familiar.

The display of duplicate message indicators on a display device incorporated by a selective call receiver conveniently informs the user as to the presence of duplicate messages stored in the memory. Conventional selective call receivers force the user to read each message to determine if it is a duplicate of a previously received message, whereas the user may now save time spent reading the duplicate messages by simply checking the display device for the presence of duplicate message indicators. Additionally, memory space in a portable selective call receiver is not depleted through storage of duplicate messages when the features of the present invention are practiced. If a duplicate message is received by the pager, it will not be stored, therefore not using twice or three times more memory than necessary for storage of a message.

By now it should be appreciated that there has been provided a method and apparatus for quickly and without wasted effort by a user indicating that a duplicate message has been received while also conserving memory resources of the selective call receiver.

What is claimed is:

1. A selective call receiver for presenting a plurality of messages to a user, comprising:
 receiver means for receiving messages;
 storage means coupled to the receiver means for storing the received messages;
 determining means coupled to the receiver means and the storage means for determining whether a received message is substantially equivalent to any of previously stored messages; and
 presenting means coupled to the storage means for visually displaying message icons to the user indicative of the previously stored messages, wherein the presenting means is further coupled to the determining means for displaying a duplicate message icon to the user in response to the determining means determining that the received message is a duplicate message that is substantially equivalent to one of the previously stored messages, and wherein the duplicate message icon indicates which of the previously stored messages is the one of the previously stored messages.

2. A selective call receiver for presenting a plurality of messages to a user, comprising:
 a receiver for receiving messages;
 a memory for storing the received messages;
 processing means coupled to the receiver and the memory for determining whether a received message is substantially equivalent to any of previously stored messages;
 a display device coupled to the memory for visually displaying message icons to the user indicating the number of the previously stored messages, wherein the display device is further coupled to the processing means for displaying a duplicate message icon to the user in response to the processing mans determining that the received message is a duplicate message that is substantially equivalent to one of the previously stored messages, and wherein the duplicate message icon indicates which of the previously stored messages is the one of the previously stored messages; and
 alerting means coupled to the processing means for alerting the user in response to the processing means receiving a message.

3. The selective call receiver in accordance with claim 2, wherein the message icons are displayed on the display device in an order in which the previously stored messages corresponding thereto were received.

4. The selective call receiver in accordance with claim 3, wherein each of the message icons flashes until a previously stored message corresponding thereto has been displayed.

5. The selective call receiver in accordance with claim 3, wherein the duplicate message icon is displayed beneath one of the message icons to indicate that the duplicate message is substantially equivalent to the one of the previously stored messages corresponding to the one of the message icons.

6. The selective call receiver in accordance with claim 5, wherein the duplicate message icon and the one of the message icons flash until the one of the previously stored messages corresponding thereto has been displayed.

7. The selective call receiver in accordance with claim 4, wherein:
 reception of further duplicate messages, substantially equivalent to the one of the previously stored messages, by the selective call receiver causes the duplicate message icon and the one of the message icons to flash until the one of the previously stored messages corresponding thereto has been displayed.

8. In a selective call receiver for presenting a plurality of messages to a user, a method for indicating to a user that a duplicate message has been received, the method comprising the steps of:
 (a) receiving a message;
 (b) storing the received message in a memory;
 (c) determining whether the received message is substantially equivalent to any of previously stored messages; and
 (d) displaying a duplicate message icon if the received message is a duplicate message that is substantially equivalent to one of the previously stored messages, wherein the duplicate message icon indicates which of the previously stored messages is the one of the previously stored messages.

9. In a selective call receiver for presenting a plurality of messages to a user, a method for indicating to a user that a duplicate message has been received comprising the steps of:
 (a) receiving messages;
 (b) storing the received messages in a memory;
 (c) determining whether each of the received messages is a duplicate message that is substantially equivalent to any of previously stored messages;
 (d) displaying a message icon corresponding to each previously stored message; and
 (e) displaying a duplicate message icon corresponding to each received message that is a duplicate message that is substantially equivalent to one of the previously stored messages, wherein the duplicate message icon indicates to the user which of the previously stored messages is the one of the previously stored messages.

10. The method in accordance with claim 9, wherein step (e) comprises the step of:
 (f) displaying a duplicate message icon indicating to the user which of the message icons corresponds to the one of the previously stored messages that is substantially equivalent to the duplicate message.

11. The method in accordance with claim 9, wherein step (d) comprises the step of (g) displaying a first message icon corresponding to the one of the previously stored messages; and step (e) comprises the step of (h) displaying a duplicate message icon, corresponding to a first duplicate message that is substantially equivalent to the one of the previously stored messages, beneath the first message icon.

12. The method in accordance with claim 11, further comprising the step of:

(i) flashing the first message icon until the one of the previously stored messages has been displayed.

13. The method in accordance with claim 11, further comprising the step of:

(j) after reception of the duplicate message, flashing the duplicate message icon and the first message icon until the one of the previously stored messages has been displayed.

14. The method in accordance with claim 11, further comprising the step of:

(k) after reception of further duplicate messages, flashing the duplicate message icon and the first message icon until the one of the previously stored messages has been displayed.

* * * * *